Oct. 9, 1923.   1,470,199
A. SMALL
COOKING UTENSIL
Filed April 14, 1921
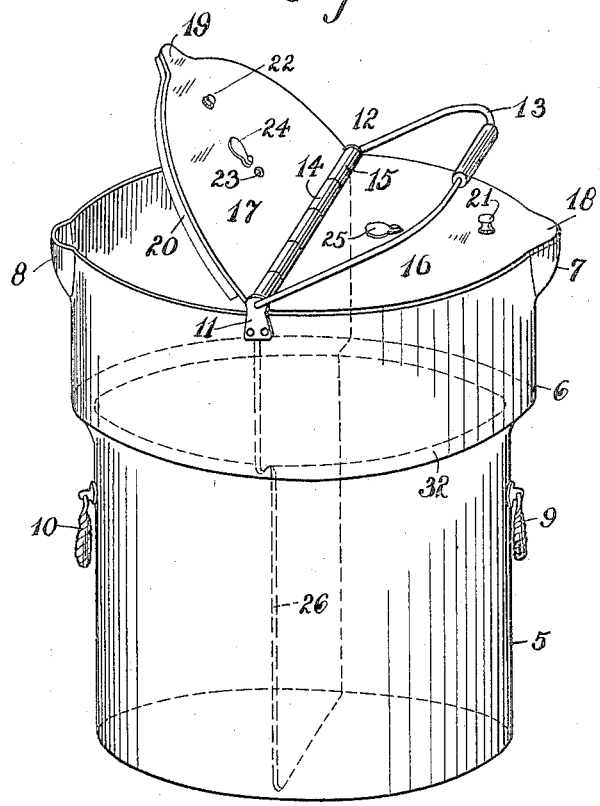
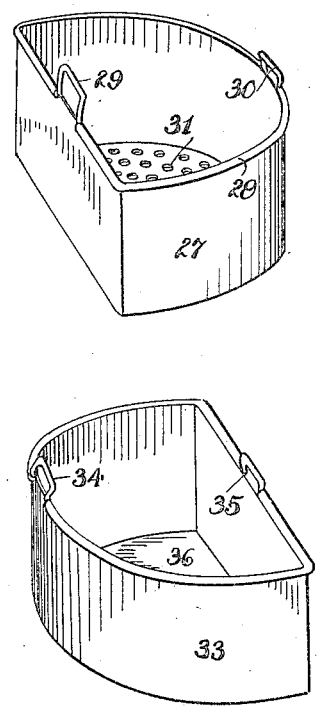
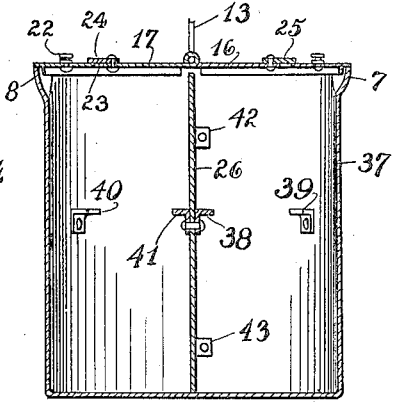
Inventor
Adina Small
By her Attorney Patented Oct. 9, 1923.

1,470,199

UNITED STATES PATENT OFFICE.

ADINA SMALL, OF NEW YORK, N. Y.

COOKING UTENSIL.

Application filed April 14, 1921. Serial No. 461,449.

*To all whom it may concern:*

Be it known that I, ADINA SMALL, a subject of the King of England, and resident of the borough of Manhattan, county of New York, State of New York, have invented certain new and useful Improvements in Cooking Utensils, of which the following is a specification.

This device has for its special objects the provision of a cooking pot for ordinary use and wherein a number of objects or liquids can be cooked simultaneously and in this exposition of the invention I show a construction wherein four different materials can be cooked at one time.

Another object of the invention is to provide means for readily handling the materials being cooked and for keeping them so separated that they may be served individually and so that even during cooking the odors from the several articles or liquids do not mix.

With these and other objects in view the following is what I consider a good means of carrying out the invention and the accompanying drawing should be considered for a complete understanding of the specification which follows.

In the drawing—

Fig. 1 is a perspective view of the container or cooking utensil.

Fig. 2 is a perspective view of a part removed.

Fig. 3 is a perspective view of another part, and

Fig. 4 is a sectional view of a container of somewhat different construction.

Similar reference numerals indicate like parts in all the figures where they appear.

My cooking utensil is made up of a plurality of containers certain of which are operable within another. I will refer to the larger or receiving member as the pot 5 and this pot is provided with an enlarged or over-hanging portion 6 which gives it the external appearance of the so-called double-boiler.

I produce spouts 7 and 8 upon the overhanging portion 6 and at the upper edge thereof, and these spouts are on opposite sides of the pot. Under the spouts and upon the smaller portion of the pot or that portion of less diameter I secure handles 9 and 10 which may be employed in discharging the content of the pot.

At the upper edge of the pot and at right angles to the spouts 7 and 8 I secure lugs 11 and 12 into which a bail or lifting handle 13 may be attached and secured and the free ends of the bail 13 may be passed inward to provide a pintle for hinges 14 and 15 formed integral with cover members 16 and 17.

The cover members 16 and 17 are also provided with projections 18 and 19 intended to close the spouts 7 and 8 and they also have flanges 20 which enter the open portion of the pot and complete the closing thereof.

I also provide knobs 21 and 22 by means of which the cover members may be raised and perforations 23 each closed by a plate or valve 24 or 25 and by means of which the steam may be allowed to escape from the pot either before the content of the pot is discharged or even during the cooking process.

An exceedingly important feature of the construction of this pot is the partition shown by the dotted lines 26 in Figure 1. This partition should be secured to the bottom and sides of the pot, should extend parallel with the hinge 14—15 and should be so formed and secured that the liquid from one portion of the pot cannot pass into the other portion.

I provide a plurality of insert members as a part of this utensil as are shown in Figures 2 and 3. The member 27 shown in Fig. 2 is provided with a rolled edge 28 through which is extended a wire forming the lifting handles 29 and 30. This member is also provided with a perforated bottom 31 and when in place this member will rest upon the shoulder 32 formed by the over-hanging or outwardly projecting portion 6 of the pot 5.

The member 33 shown in Fig. 3 is also provided with handles as indicated at 34 and 35. This device may be quite similar to the member 27 but the bottom plate 36 is not perforated. I may employ 2 perforated devices or two insert members the bottoms of which are not perforated.

In the construction shown in Fig. 4 the walls of the pot may be straight or without over-hanging portion as shown at 37 though in this device lips or spouts 7 and 8 and covers 16 and 17 and a center partition 26 and bail 13 should all be provided as previously described.

As the sides of this device are straight there is no shoulder 32 upon which the insert members such as 27 and 33 may rest and therefore I provide cleats 38 and 39 and 40 and 41 to receive the insert members and if desired the center partition 26 may be provided with lugs 42 and 43 for additional security and other modifications may be made within the scope of the appended claim without departing from the principle or sacrificing the advantages of the invention.

Having carefully and fully described my invention, what I claim and desire to secure by Letters Patent is:

A cooking utensil comprising a receiving member, a plurality of independent containers operable therein, an annular shoulder formed integral in the walls of said receiving member for supporting said containers and a partition in said receiving member for separating said containers and for retaining them upon said shoulder.

Signed at New York city, county and State of New York, this 30th day of March, 1921.

ADINA SMALL.